United States Patent Office 2,989,508
Patented June 20, 1961

2,989,508
SOLUTION POLYMERIZATION
Donald E. Hudgin, Summit, and Frank M. Berardinelli, South Orange, N.J., assignors to Celanese Corporation of America, New York, N.Y., a corporation of Delaware
No Drawing. Filed Oct. 21, 1957, Ser. No. 691,145
20 Claims. (Cl. 260—67)

This invention relates to an improved method for producing a tough, high molecular weight material by the polymerization of trioxane.

It is known that trioxane may be polymerized in the presence of small amounts of certain catalytic materials, principally fluorine-containing materials, to produce a tough, high molecular weight polymer, known as polyoxymethylene which is useful in the production of molded or extruded articles. The procedures utilized involve the blending of molten trioxane with the catalytic material, when the latter is a normally solid or normally liquid material or the contacting of the gasiform catalytic material with molten or solid trioxane. The use of gasiform catalytic materials involves obvious handling difficulties and does not effect uniform contact between the reactants.

Such procedures even with solids or liquid catalytic materials, are disadvantageous in that they are not readily adaptable to large scale and particularly to continuous production methods. They are also disadvantageous, particularly with rapidly acting catalytic materials in that they do not permit uniform admixture of the reaction components before substantial reaction takes place.

When polymerization takes place in molten trioxane with a highly effective catalyst, conversion to the polymer is substantially complete and the polymer formed fills the entire volume of the reaction mass. In order to subject the polymer produced to washing or other purification procedures the polymer mass must be broken up mechanically. This is costly and impractical for large scale production.

In addition to the disadvantage in handling, the prior procedures are disadvantageous, particularly with a highly active catalyst, in that they do not produce a product which is uniformly high in quality. For optimum products with a particular catalyst there is an optimum range of catalyst concentration in the reaction zone. During the incorporation of a relatively small volume of catalyst in a large volume of trioxane there are local zones of extremely high catalyst concentration in which the polymerization takes place to produce inferior polymer.

It is an object of this invention to provide a novel procedure whereby catalytic polymerization of trioxane may proceed to produce a uniform and easily handleable product. Other objects will appear hereinafter.

The objects of this invention are accomplished by a process which comprises polymerizing trioxane in a liquid phase admixture comprising trioxane, a trioxane-polymerization catalyst and a non-aqueous solvent for at least one of the aforementioned components.

In one aspect, the invention comprises dissolving the trioxane-polymerization catalyst in a non-aqueous solvent and blending the solution with trioxane to form a liquid phase admixture. Even very minor amounts of solvent will produce some benefit since the use of any solvent will reduce the concentration of the catalyst in the local zones where undistributed catalyst solution may predominate prior to complete distribution. Generally, it is preferred to dissolve the catalyst in at least 20 parts by weight of solvent per part of catalyst in order to reduce the catalyst concentration in the zones of undistributed catalyst solution.

Since the amount of catalyst used is very small, of the order of 0.005 to 2% the amount of catalyst solution may also be small. When this is so, the melting point of trioxane will be very little affected by the presence of the catalyst solvent. It will therefore be necessary to maintain the admixture at a temperature not lower than about the normal melting point when using small amounts of solvent.

The solution of the trioxane-polymerization catalyst in a non-aqueous solvent prior to blending with molten trioxane is particularly useful when the catalyst is a very active catalyst which would otherwise induce substantial polymerization before being thoroughly dispersed. The procedure is particularly useful with catalysts which can polymerize molten trioxane in bulk to the extent of 40% in one hour at a temperature allowed to rise from 70° to 100° C. when present at a concentration of 0.01 weight percent. Catalysts comprising boron fluoride coordinate complexes with organic compounds in which oxygen or sulfur is the donor atom are particularly useful. Such catalysts are described in our application Serial No. 691,-143, filed concurrently herewith.

The invention also contemplates the solution of trioxane in a sufficient amount of normally liquid non-aqueous solvent so that the solvent predominates and the solution remains in liquid phase at temperatures far below the melting point of the trioxane. For example, one part of the trioxane may be dissolved in from about ½ to about 20 parts by weight of a solvent, such as benzene, to produce a solution which may be polymerized at room temperature and from which the polymer precipitates out in particles as it is formed rather than forming a solidified mass.

Insofar as the solution of trioxane in a large amount of solvent permits liquid phase operation at lower temperatures, the procedure is useful with all trioxane-polymerization catalysts. But the principal advantage of the procedure, that of avoiding the formation of coherent polymer masses is particularly associated with rapidly acting catalysts such as the boron fluoride coordinate complexes.

Any of the known catalysts for the polymerization of trioxane may be used in accordance with this invention. It is known, for example, that inorganic fluorine-containing catalysts, such as antimony trifluoride, antimony fluoborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorous pentafluoride, hydrogen fluoride and fluosulfonic acid are effective catalysts for polymerizing trioxane to a tough, high molecular weight material. Other catalysts recently found to be effective in addition to the boron fluoride coordinate complexes disclosed above and in addition to boron fluoride which is disclosed in our application Serial No. 691,144, filed concurrently herewith, are thionyl chloride, ethane sulfonic acid, phosphorus trichloride, titanium tetrachloride, ferric chloride, zirconium tetrachloride, aluminum trichloride and stannic chloride. Stannous chloride, previously reported to have no catalytic activity has also been found to be an effective catalyst.

The preferred solvents are mutual solvents for the catalyst and for trioxane. Although trioxane is soluble in many solvents, the invention does not contemplate any particular solvent as preferable in all aspects because of the diversity of the catalytic materials used.

For the preferred class of catalyst, the coordinate complexes of boron fluoride with organic compounds in which oxygen is the donor atom, a wide variety of mutual solvents may be used. Among the specific solvents found to be satisfactory where boron fluoride etherate is the catalyst are cyclohexane, benzene, ethylene dichloride, pentane, trichloroethylene, ligroin (90–100° B.Pt.), carbon tetrachloride, octane, symmetrical tetrachlorethane, nitromethane, nitroethane, 1,1,1-trichloroethane, diethyl ether, petroleum ether (30–60° B.Pt.) methylene chloride, and a mixture of tetrahydrofuran and methyl cyclohexane.

Although mutual solvents are preferred, it is to be understood that at least some of the advantages of the invention may be obtained when a solvent for the catalyst is used which is not miscible with the trioxane or when a solvent for trioxane is employed which is not a solvent for the catalyst.

The trioxane, the solvent and the catalyst are preferably anhydrous or substantially anhydrous. Small amounts of moisture, as may be present in commercial grade trioxane do not inhibit polymerization, but should be removed for polymer of highest quality. The trioxane, catalyst and solvent should also be free of large quantities of other reactant materials which might react with the incipient polymer and stop the growth of the polymer chains.

It is contemplated in this invention that polymerization shall take place in the liquid phase. The temperature at which liquid phase is maintained is dependent upon the nature and proportion of the solvent. In general, temperatures between about −10° and 114° C. may be used, provided that other conditions are proper for the maintenance of a liquid phase.

With some catalysts, reaction rates at low temperatures, even in the liquid phase may be very low. For example, the reaction rate with boron fluoride phenol complex is very low below about 50° C. With such catalysts it is obviously preferable to operate at higher temperatures.

*Example 1*

A solution of 100 grams trioxane and 400 ml. of benzene was heated to boiling and a small amount of water removed by use of a Dean-Stark trap. Then approximately 75 ml. was distilled off. The solution was cooled to 25° C. and 0.1 gram $BF_3$-etherate was added with stirring. After about fifteen minutes the solution began to turn cloudy. Stirring was continued for about 24 hours. The slurry was filtered and the polymer refluxed twice with 500 ml. water, filtered and dried overnight at 60–65° C. A yield of 27.6 grams of polyoxymethylene was obtained. A white translucent disc was compression molded at 180° C. for 2 minutes by using 10 percent diphenylamine as stabilizer for the polymer. The unstabilized polymer showed an inherent viscosity of 0.65 when measured in p-chlorophenol (containing 2% alpha pinene) at 60° C. at 0.5 percent concentration.

*Example 2*

A solution of 100 grams trioxane and 400 ml. benzene was dried by azeotroping as in Example No. 1. A purified nitrogen stream was also continuously conducted through the solution. The solution was cooled at 35° C. and 0.1 gram $BF_3$-etherate added with stirring. Heating was started and in 5 minutes at 43° C. the solution became cloudy. Refluxing started in an additional 20 minutes and was continued for 50 minutes at which time the condenser clogged due to polymer being formed also in the condenser. The reaction mixture was cooled, filtered and the polymer refluxed twice with water, filtered and dried overnight at 60–65° C. A yield of 36.8 grams was obtained. The polymer showed an inherent viscosity of 0.73 when measured in p-chlorophenol (containing 2% alpha pinene) at 60° C. at 0.5 percent concentration. When stabilized with 1% to 10% diphenylamine, the polymer could be compression molded into discs using a molding time of 2 minutes at 180° C.

*Example 3*

A solution of 100 grams trioxane and 400 ml. benzene was dried by azeotroping as in Example No. 1. A purified nitrogen stream was also continuously conducted through the solution. The solution was cooled to 60° C. and 0.2 gram $BF_3$-etherate added with stirring. Stirring was continued and the temperature held at 60–65° C. for approximately 6½ hours. The slurry was filtered, refluxed twice with water and dried overnight at 60–65° C. The yield of polymer was 65.3 grams.

The above procedure was repeated with the exception that only 0.03 gram $BF_3$-etherate was used. A yield of 19.2 grams was obtained. The polymer had an inherent viscosity of 0.60 when measured in p-chlorophenol (containing 2% alpha pinene) at 60° C. at 0.5% concentration. When stabilized with 10% diphenylamine discs could be compression molded at 180° C. in two minutes.

*Example 4*

One hundred grams trioxane was agitated with 5 grams molecular sieve (Linde type 5A) for one-half hour at 80° C. after which it was filtered into a three-neck flask fitted with reflux condenser stirrer, thermometer and dropping funnel. There was then added to the stirred trioxane, 250 ml. cyclohexane (dried over sodium) containing 0.1 g. $BF_3$-etherate over a period of five minutes. The temperature dropped to 62° C. but was raised to 75° C. by externally heating. It was held at 75° C. for 2½ hours, after which the mixture was filtered hot. The polymer was washed twice with 14% aqueous ammonia solution at 60–70° C. and then with water at 90–95° C. After filtering and drying, the polymer had an inherent viscosity of 0.63 when measured in p-chlorophenol (containing 2% alpha pinene) at 60° C. at a concentration of 0.5%. Opaque white discs could be compression molded at 180° C. in two minutes when the polymer was stabilized with either diphenylamine or octadecylamine at the 2 to 10% levels.

*Example 5*

One hundred and fifty grams trioxane was dried with 7.7 grams of molecular sieve (Linde type 5A) by stirring at 80–90° C. for one-half hour. The trioxane was then filtered into a flask fitted with reflux condenser, stirrer, thermometer and dropping funnel. There was then added to the trioxane 150 grams dry cyclohexane and the solution heated to 70–75° C. when 0.005 g. $BF_3$-etherate was added. After fifteen minutes the polymer began to form slowly. A second 0.05 g. $BF_3$-etherate was added one hour after the first and subsequently a third 0.05 g. portion one hour after the second. After one more hour at 75° C. the reaction mixture was filtered. The polymer was washed twice with 14% $NH_4OH$ solution at 60–65° C. This was followed by a water wash at 90–95° C. After drying overnight at 60–65° C. the polymer weighed 85.8 grams. When the polymer was stabilized with a mixture of 5% diphenylamine and 5% octylphenol, discs could be compression molded at 200° C. in 2 minutes.

*Example 6*

A solution of 100 grams trioxane and 100 grams benzene was heated to 35° C. and 0.2 gram $BF_3$-etherate added. Polymer began forming almost immediately. Heating was continued and the temperature rose to 60° C. in 2 minutes. Heating was stopped but the temperature continued to rise until it reached 80° C. Heating was started again and a temperature of 79–80° C. was maintained for 4¾ hours, after which 100 ml. benzene was added to help slurry the reaction mixture. The polymer was filtered off, refluxed twice with water, filtered and dried at 60–65° C. overnight. The polymer weighed 92.4 grams. The polymer was stabilized with 5% diphenylamine and compression molded into discs at 180° C. in 2 minutes.

*Example 7*

Three thousand grams trioxane was heated to 90° C. in a flask and solution of 0.33 gram $BF_3$-etherate in 25 ml. benzene was added (in about 30 seconds) to the wellstirred molten trioxane. The trioxane went solid almost immediately and the temperature rose to 113° C. within one minute. After standing overnight the polymer was pulverized and washed three times with water at 90-95° C. After drying overnight at 60-65° C. the polymer weighed 2156 grams (72% yield). A portion of this polymer was tested and found to have a weight less when maintained at 222° C. of 1.0% per minute. Two grams of the polymer was stabilized with 2.5% diphenylamine and compression molded at 180° C. for 2 minutes. The disc thus formed was quite tough, white and translucent.

Two thousand grams of the polymer was stabilized with 5% diphenylamine and converted by extrusion at about 380° F. into ⅛ inch rod was then chip ground and injection molded into test bar. These bars were white, translucent and very tough. Conditions for injection molding were as follows:

| | | |
|---|---|---|
| Nozzle temperature | °F | 420 |
| Front cylinder temp. | °F | 430 |
| Back cylinder temp. | °F | 410 |
| Die temperature | °F | 140 |
| Cycle time | seconds | 45 |
| Dwell time | do | 15 |
| Cylinder pressure | p.s.i. | 20,000 |

Physical properties were found to be as follows:

| | |
|---|---|
| Heat distortion temperature, 264 p.s.i. | 80° C. |
| Deformation under load, 2000 p.s.i. | 1.5%. |
| Impact strength, Izod 73° F. | 1.7 ft. lb./in. |
| Rockwell hardness | M73 |
| Flexural strength | 12,000 p.s.i. |
| Flexural modulus, 73° F. | 3,000,000 p.s.i. |
| Tensile strength, 73° F. | 7,000 p.s.i. |

The injection-molded polymer had an inherent viscosity of 1.37 as measured in p-chlorophenol (with 2% alpha pinene) at 60° C. at 0.5% concentration.

*Example 8*

Three thousand five hundred and forty-eight grams trioxane was melted at 80-90° F. and filtered to remove certain impurities. The filtered trioxane was placed in a flash tank fitted with thermometer and stirrer. The temperature was raised to 90° C. and a solution of 0.394 gram $BF_3$-etherate in 20.6 ml. benzene was poured into the trioxane all at once with rapid stirring. The mixture became solid in about fifteen seconds and the temperature rose to 125° C. in about five minutes. After standing overnight the reaction product was broken up, pulverized and washed three times with water at 90-95° C. After filtering the polymer was then dried overnight at 60-65° C. It weighed 2631 grams (74% yield).

On stabilizing with either diphenylamine (5 to 10%) or N,N,N',N'-tetrakis (2-hydroxypropyl) ethylene diamine (0.5-5%) discs were compression molded at 180° C. in 2 minutes.

*Example 9*

Three thousand three hundred and six grams of trioxane was melted and filtered into a flask fitted with stirrer and thermometer. The temperature of the molten trioxane was adjusted to 64° C. and 0.367 g. $BF_3$-etherate dissolved in 27.6 ml. benzene was poured in all at once. The polymerization started after fifteen seconds of vigorous stirring and in thirty seconds the contents of the flask became solid. The temperature rose to 140° C. in thirteen minutes. After standing overnight the reaction product weighed 3114 g. After pulverizing, water washing (3 times) at 90-95° C. and drying at 60-65° C. for about 60 hours the polymer weighed 2925 grams (89% yield). Discs stabilized with either 5% diphenylamine or 1% N,N,N'-tetrakis (2-hydroxypropyl) ethylene diamine could be compression molded in 2 minutes at 180° C.

*Example 10*

Thirty six hundred grams trioxane was melted and filtered into a flask fitted with thermometer and stirrer. The temperature of the molten trioxane was adjusted to 64° C. and 0.197 g. $BF_3$-etherate dissolved in 14.8 ml. dry benzene was poured into the flask all at once. In thirty seconds the flask contents went solid and the temperature rose to a peak of 115° C. in ten minutes. After standing overnight the reaction product was pulverized, washed three times with water at 90-95° C. and dried overnight at 60-65° C. The polymer weighed 3124 g. (89% yield).

On stabilizing with 5% diphenylamine, tough, white, translucent discs were compression molded at 190° C. in two minutes.

*Example 11*

A solution of 150 grams trioxane in 185 grams of ethylene dichloride was stirred with 3.35 grams calcium hydride for one hour at 70° C. under a nitrogen atmosphere. The solution was then filtered under a nitrogen atmosphere into a reaction flask. The temperature was allowed to drop to 36° C. and 0.036 grams $BF_3$ etherate was added. The temperature rose to 85° C. in five minutes. After stirring for two hours and forty minutes at 70° C. the reaction mixture was cooled to room temperature.

Two hundred milliliters ethyl ether was added and the mixture was stirred 10 minutes and filtered. This was repeated with 300 ml. ether and filtered. The polymer thus obtained was washed three times with water at 90° C., filtered and dried at 60° C. overnight. The yield of polymer was 77 percent.

The polymer had an inherent viscosity of 1.04 when measured in p-chlorophenol containing 2 percent alpha pinene at 0.5 concentration at 60° C. When the polymer was stabilized with 5% diphenylamine and compression molded at 190° C. for 4 minutes, a tough white translucent disc was produced.

It is to be understood that the foregoing detailed description is given merely by way of illustration and that many variations may be made therein without departing from the spirit of our invention.

Having described our invention, what we desire to secure by Letters Patent is:

1. A method of producing a tough, high molecular weight material which comprises polymerizing trioxane in a liquid phase admixture comprising trioxane, a small catalytic amount of a boron fluoride-containing trioxane-polymerization catalyst and a non-aqueous solvent for at least one of the aforementioned components to produce said tough, high molecular weight material.

2. A method of producing a tough, high molecular weight material which comprises polymerizing trioxane in a liquid phase admixture comprising trioxane and a solution of a small catalytic amount of a boron fluoride-containing trioxane-polymerization catalyst in a non-aqueous solvent and recovering said tough, high molecular weight material from said admixture.

3. A method of producing a tough, high molecular weight material which comprises polymerizing trioxane in a liquid phase admixture comprising a solution of trioxane in a non-aqueous solvent and a small catalytic amount of a boron fluoride-containing trioxane-polymerization catalyst and recovering said tough, high molecular weight material from said admixture.

4. A method of producing a tough, high molecular weight material which comprises polymerizing trioxane in a liquid phase admixture comprising trioxane, a small catalytic amount of a small amount of a boron fluoride-containing trioxane-polymerization catalyst and a non-aqueous mutual solvent for the aforementioned components to produce said tough, high molecular weight material.

5. The method of claim 2 in which the catalyst is dissolved in at least 20 parts by weight of solvent for each part of catalyst.

6. The method of claim 3 in which the trioxane is dissolved in from about ½ to about 20 parts by weight of solvent for each part of trioxane.

7. A method for producing a tough, high molecular weight material which comprises polymerizing trioxane in a liquid phase admixture comprising trioxane, a small catalytic amount of a coordinate complex of boron fluoride with an organic compound in which the donor atom is an element of the group consisting of oxygen and sulfur and a non-aqueous solvent for at least one of the aforementioned components to produce said tough, high molecular weight material.

8. A method of producing a tough, high molecular weight material which comprises polymerizing trioxane in a liquid phase admixture comprising trioxane and a small catalytic amount of a solution of a coordinate complex of boron fluoride with an organic compound in which oxygen is the donor atom in a non-aqueous solvent.

9. A method of producing a tough, high molecular weight material which comprises polymerizing trioxane in a liquid phase admixture comprising a solution of trioxane in a non-aqueous solvent and a small catalytic amount of a coordinate complex of boron fluoride with an organic compound in which oxygen is the donor atom.

10. A method of producing a tough, high molecular weight material which comprises polymerizing trioxane in a liquid phase admixture comprising trioxane not more than about 2% of a coordinate complex of boron fluoride with an organic compound in which oxygen is the donor atom and a non-aqueous mutual solvent for the aforementioned components.

11. The method of claim 8 in which the catalyst is dissolved in at least 20 parts by weight of solvent for each part of catalyst.

12. The method of claim 9 in which the trioxane is dissolved in from about ½ to about 20 parts by weight of solvent for each part of trioxane.

13. The method of claim 10 in which the trioxane is dissolved in from about ½ to about 20 parts by weight of cyclohexane for each part of trioxane.

14. The method of claim 10 in which the trioxane is dissolved in from about ½ to about 20 parts by weight of benzene for each part of trioxane.

15. The method of claim 10 in which the trioxane is dissolved in from about ½ to about 20 parts by weight of ethylene dichloride for each part of trioxane.

16. The method of claim 1, wherein said solvent is cyclohexane.

17. The process of claim 1, wherein said catalyst is a catalyst capable of polymerizing molten trioxane in bulk to the extent of 40% in one hour at a temperature allowed to rise from 70° C. to 100° C. when present in a concentration of 0.01 weight percent.

18. A method of producing a tough, high molecular weight material which comprises polymerizing trioxane in a liquid phase admixture comprising a solution of trioxane in from about ½ to 20 parts by weight of cyclohexane and from about 0.005 to about 2% by weight, based on the trioxane, of a coordinate complex of boron fluoride with an organic compound in which oxygen is the donor atom.

19. A method of producing a tough, high molecular weight material which comprises polymerizing trioxane in liquid phase admixture comprising trioxane, cyclohexane and a small catalytic amount of a material which can polymerize molten trioxane in bulk to the extent of 40% in one hour at a temperature allowed to rise from 70° C. to 100° C. when present at a concentration of 0.01 weight percent.

20. The method of claim 1 wherein said boron fluoride-containing catalyst is molecular boron fluoride.

References Cited in the file of this patent

UNITED STATES PATENTS

| | | |
|---|---|---|
| 2,270,135 | Mikeska et al. | Jan. 13, 1942 |
| 2,477,225 | Zoss | July 26, 1949 |
| 2,717,885 | Greenlee | Sept. 13, 1955 |
| 2,768,994 | MacDonald | Oct. 30, 1956 |
| 2,795,571 | Schneider | June 11, 1957 |

OTHER REFERENCES

Staudinger: "Hochmolekulare Organische Verbindungen" (1932), pp. 255–262.

Walker, "Formaldehyde, A. C. S. Monograph #120 (1953), pp. 143–146.